2,998,405
STABILIZED POLYOLEFIN COMPOSITIONS
Winfred E. Weldy, Wilmington, Del., assignor to Hercules Powder Company, Wilmington, Del., a corporation of Delaware
No Drawing. Filed Aug. 25, 1959, Ser. No. 835,847
17 Claims. (Cl. 260—45.8)

This invention relates to polyolefin compositions and more particularly to the stabilization of polymers of olefins containing three or more carbon atoms against heat degradation.

High molecular weight polymers of olefins containing three and more carbon atoms have recently been developed that show great promise in the plastics industry and the many other applications of thermoplastic materials. However, these hydrocarbon polymers, and particularly the stereoregular polymers when mechanically worked as, for example, in extruding, molding, spinning, etc., processes are subject to considerable degradation at the high temperatures required for processing. Degradation also occurs on exposure of the finished article to heat as may be encountered in use as, for example, use in film, filaments, plastic sheeting, etc.

Now in accordance with this invention it has been found that polymers of $\alpha$-olefins containing three or more carbon atoms and particularly stereoregular polymers of the higher olefins may be stabilized against heat degradation by incorporating in the polymer composition a small amount of a thiodiarylamine, i.e. an arylthiazine. The stabilization so obtained may be even further enhanced by the addition of a small amount of a dialkyl ester of thiodipropionic acid and in fact a synergistic effect is noted when these two stabilizers are used together.

Any solid, high molecular weight polymer of an olefin containing three or more carbon atoms may be stabilized in accordance with this invention by the addition of a thiodiarylamine. Exemplary of these polymers are polypropylene, poly(1-butene), poly(1-pentene), poly(3-methyl-1-butene), poly(4-methyl-1-pentene), polystyrene, etc. Copolymers of such olefins as, for example, ethylene—propylene, ethylene—butene, etc., copolymers, may likewise be stabilized by the process of this invention. Particularly outstanding results are obtained in the case of the stereoregular polymers, which are sometimes referred to as isotactic polymers. The solid, high molecular weight polymers that may be stabilized in accordance with this invention may be prepared by any of the well-known methods for preparing solid, high molecular weight, stereoregular polymers as, for example, by the processes of Belgian Patents 530,617; 538,782; 546,846; 548,964; 549,891; 549,909; 549,910; 555,890; 557,115; etc. The polymers will vary somewhat in their melting point, molecular weight, viscosity, etc., according to variations in the process of manufacture.

Any thiodiarylamine may be used in accordance with this invention to stabilize polyolefins as, for example, thiodiphenylamine (phenothiazine), thiophenyl-[$\alpha$ or $\beta$]-naphthylamine (benzophenothiazines), thiodinaphthylamine (dibenzophenothiazine), and their substitution derivatives. These thiodiarylamines have the general formula

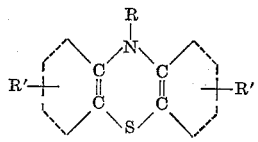

where each pair of carbons in the thiazine nucleus is a part of an aryl nucleus, i.e. a benzo or naphtho group, R is hydrogen or a lower alkyl as, for example, methyl, ethyl, propyl, etc., and R' is hydrogen, lower alkyl, hydroxy, halogen, nitro, cyano, or alkoxy and both R's may be alike or different. Exemplary of these thiodiarylamines are phenothiazine, N-alkyl-phenothiazines, 1,9-dimethyl-phenothiazine, 3,7-dimethyl-phenothiazine, benzophenothiazine, i.e. benzo [$\alpha$ or $\beta$]-phenothiazine, naphthothiazine, i.e. dibenzophenothiazine, etc.

The amount of the thiodiarylamine incorporated in the polyolefin may be varied from a very small stabilizing amount up to several per cent, but outstanding results have been obtained when from about 0.02% to about 2% and preferably from about 0.1% to about 1.0% based on the weight of polymer is used.

As pointed out above, a synergistic effect in the stabilization of these polymers with a combination of a thiodiarylamine and a diester of thiodipropionic acid is obtained that was entirely unexpected, particularly with these crystalline, isotactic polymers. In fact, such outstanding stability is attained that it makes it possible to use such polymers as stereoregular polypropylene for many applications that previously had not been possible as, for example, as hot water or steam pipes, etc.

Any dialkyl ester of thiodipropionic acid may be used in combination with the thiodiarylamine to obtain the outstanding stabilization of polypropylene and the higher polyolefins in accordance with this invention. Exemplary of these esters are the dimethyl, diethyl, dibutyl, bis(3,3,5-trimethylhexyl), didecyl, dilauryl, dihexadecyl, distearyl, etc., esters of dithiopropionic acid.

The amount of the dialkyl thiodipropionate incorporated along with the thiodiarylamine in the polyolefin may be varied from a very small stabilizing amount up to several per cent, but outstanding results have been obtained when from about 0.01% to about 5% and preferably from about 0.05% to about 2.0% based on the weight of polymer is used.

The stabilizers used in accordance with this invention may be admixed with the polyolefin by any of the usual procedures for incorporating an antioxidant in a solid material. A simple method is to dissolve the antioxidants in a low-boiling solvent such as acetone or hexane, etc., and, after thoroughly mixing the stabilizer solution with the polymer in flake or other such form, evaporating the solvent or they may be incorporated by various means of mechanical mixing, etc., as for example, dry mixing and then extruding into molding powder, fiber, film, etc.

The stabilizers of this invention may be used in combination with other stabilizers such as ultraviolet light absorbers, antiacids such as calcium soaps, or other antioxidants. Other materials may also be incorporated in the polymer as, for example, pigments, dyes, fillers, etc.

The following examples will illustrate the tremendous stabilization that is obtained when polyolefins are stabilized in accordance with this invention. All parts and percentages are by weight unless otherwise indicated. By the term "Reduced Specific Viscosity" (RSV) is meant the $\eta\text{sp.}/c$ determined on an 0.1% solution of the polymer in a given solvent at a given temperature.

*Example 1*

One part of a 0.5% acetone solution of phenothiazine was mixed with 1 part of a poly(4-methyl-1-pentene) flake, having an RSV of 6.0 as measured in decahydronaphthalene at 135° C. and a crystalline melting point of 243° C., for five minutes and the mixture was air-dried to remove the acetone. A sample of this material was heated in a forced-air oven in the absence of light at 200° C. and compared with a sample wherein no stabilizer was added. The heat degradation was autocatalytic. Once degradation having begun, the complete polymer deteriorated very rapidly to a brown mass. The control sample that contained no stabilizer degraded in 0.5 hour, whereas the sample containing phenothiazine took 3.25 hours to degrade. The reduced specific viscosity of the unstabilized polymer changed in 0.5 hour from 6.0 to 0.23, and the oxygen uptake amounted to 5.1% whereas the polymer containing 0.5% phenothiazine was unchanged.

*Example 2*

Samples of a poly(4-methyl-1-pentene) having an RSV of 3.5 (decahydronaphthalene at 135° C.) and a crystalline melting point of 243° C. were stabilized by mixing acetone solutions of phenothiazine and the dilauryl ester of thiodipropionic acid (LTDP), each alone, and the two together, using 0.5% of each of these stabilizers by weight based on the weight of the polymer in each case, and after thorough mixing, air-drying the polymer. These stabilized polymers were then compression molded at 260° C. to form 10-mil films. Strips of these films were then exposed in a forced-air oven at 200° C. in the absence of light and compared with a strip of film prepared from an unstabilized sample. Tabulated below is the time for each strip to degrade under these conditions:

| | Hour |
|---|---|
| Unstabilized control | 0.67 |
| +0.5% LTDP | 1.25 |
| +0.5% phenothiazine | 1.5 |
| +0.5% LTDP and 0.5% phenothiazine | 2.5 |

*Example 3*

Samples of a poly(3-methyl-1-butene) having a crystalline melting point of 310° C., were stabilized, one with 0.5% phenothiazine and a second sample with 0.5% of phenothiazine in combination with dilauryl thiodipropionic acid (LTDP), following the procedure described in Example 1. These stabilized compositions were exposed in a 200° C. forced-air oven in the absence of light and compared to a sample of the polymer containing no stabilizer. The color change that took place was observed at intervals with the following results:

| Additive | Exposure Time in Hours | | | | | |
|---|---|---|---|---|---|---|
| | 0.25 | 0.5 | 1.0 | 1.5 | 4.0 | 7.5 |
| Unstabilized | yellow | dark yellow | brown | | | |
| 0.5% Phenothiazine | no change | no change | no change | brown | | |
| 0.5% LTDP | do | yellow | brown | | | |
| 0.5% Phenothiazine, 0.5% LTDP | } do | no change | no change | no change | no change | brown |

The degree of stabilization obtained was further demonstrated by comparing the analysis for elemental oxygen on each of these degraded compositions.

| Additive | Hours Exposure | Percent Oxygen |
|---|---|---|
| Unstabilized | 0.75 | 9.1 |
| Phenothiazine | 1.5 | 9.1 |
| LTDP | 1.5 | 9.0 |
| Phenothiazine plus LTDP | 7.5 | 8.1 |

*Example 4*

Samples of crystalline polystyrene having a melting point of 225° C. and an RSV of 2.3 in α-chloronaphthalene at 135° C. were stabilized as described in Example 3, and each was exposed to heat in a 200° C. forced-air oven and compared with a sample containing no stabilizer. The rate of oxidative degradation of these four samples was followed by the change in molecular weight by measuring the reduced specific viscosity of a 0.1% solution of the polymer in α-chloronaphthalene at 135° C. The length of time required to degrade the polymer from an RSV of 2.3 to an RSV of 0.06 is tabulated below:

| Additive | Hours to Reach RSV 0.06 |
|---|---|
| Unstabilized | 5.0 |
| 0.5% Phenothiazine | 29.5 |
| 0.5% LTDP | 10.0 |
| 0.5% Phenothiazine, 0.5% LTDP | 73.5 |

*Example 5*

To demonstrate the effectiveness of phenothiazine as a heat stabilizer under temperature conditions necessary for fabrication by means of either compression molding, extrusion or melt spinning, samples of the same crystalline polystyrene used in Example 4 were stabilized by adding 0.5% phenothiazine, and tested in comparison with samples to which no stabilizer was added. These samples were held for 30 minutes in an electrically heated press at 285° C. in the absence of oxygen. Thermo degradation was measured by the change in the reduced specific viscosity of the polymer as measured on a 0.1% solution of the polymer in toluene at 25° C. The following results were obtained:

| Additive | RSV after 30 min. at 285 °C. |
|---|---|
| Unstabilized | 0.8 |
| 0.5% Phenothiazine | 1.7 |

*Example 6*

Samples of a polypropylene flake, having an RSV of 4.5 (decahydronaphthalene at 135° C.) and containing 0.4% by weight of calcium stearate were intimately mixed with acetone solutions of phenothiazine and dilauryl thiodipropionate, using 0.5% by weight of each based on the weight of polypropylene. They were then air-dried to remove the acetone. A sample of this material was heated in a forced-air oven at 133° C. and compared to a sample wherein neither phenothiazine nor dilauryl thiodipropionate was added. The unstabilized polypropylene degraded in 8 hours whereas the stabilized polypropylene degraded after 336 hours exposure.

*Example 7*

Samples of a poly(4-methyl-1-pentene) having a crystalline melting point of 243° C. and an RSV of 6.5 (decahydronaphthalene at 135° C.) were mixed with 0.5% by weight of benzo-[α]-phenothiazine and with 0.5% by weight of benzo-[α]-phenothiazine plus 0.5% by weight of dilauryl thiodipropionate using the acetone slurry mixing procedure described in Example 1. Samples of each of these two compositions along with a sample of unstabilized polymer were exposed in a 200° C. oven. Unexposed poly(4-methyl-1-pentene) is a free-flowing, white powder at 200° C. and complete degradation was taken as the stage where the polymer mass was completely liquid and brown at 200° C. The hours required for each sample to degrade at 200° C. was

| | Hour |
|---|---|
| Unstabilized polymer | 0.3 |
| Polymer + 0.5% phenothiazine | 2.0 |
| Polymer + 0.5% phenothiazine and 0.5% LTDP | 2.5 |

The foregoing examples demonstrate the high degree of heat stabilization that is obtained when a thiodiarylamine is incorporated in a polyolefin. Phenothiazine, for example, affords protection over a wide temperature range and especially in the range of 175–250° C. such as is used in spinning fibers, extrusion of film, etc. This stabilizing action is further enhanced by the addition of a dialkyl ester of thiodipropionic acid, provided that the extrusion or spinning temperature does not appreciably exceed about 200° C. since at temperatures above this, the thiodipropionates become quite volatile.

What I claim and desire to protect by Letters Patent is:

1. A stabilized polyolefin composition comprising a stereoregular polymer of an olefin selected from the group consisting of propylene, 1-butene, 1-pentene, 3-methyl-1-butene, 4-methyl-1-pentene and styrene and in intimate admixture therewith a thiodiarylamine having the formula

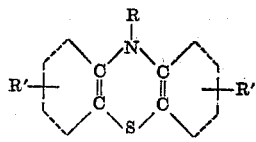

wherein each pair of carbon atoms in the thiazine nucleus is a part of an aryl nucleus, R is selected from the group consisting of hydrogen and lower alkyl radicals, and R' is selected from the group consisting of hydrogen, lower alkyl, hydroxy, halogen, nitro, cyano and alkoxy radicals.

2. The composition of claim 1 wherein the amount of thiodiarylamine is from about 0.02% to about 2% by weight of the polyolefin.

3. The composition of claim 2 wherein the thiodiarylamine is phenothiazine.

4. The composition of claim 2 wherein the thiodiarylamine is benzophenothiazine.

5. The composition of claim 3 wherein the polyolefin is poly(4-methyl-1-pentene).

6. The composition of claim 4 wherein the polyolefin is poly(4-methyl-1-pentene).

7. The composition of claim 3 wherein the polyolefin is poly(3-methyl-1-butene).

8. The composition of claim 3 wherein the polyolefin is polypropylene.

9. The composition of claim 3 wherein the polyolefin is polystyrene.

10. A stabilized polyolefin composition comprising a stereoregular polymer of an olefin selected from the group consisting of propylene, 1-butene, 1-pentene, 3-methyl-1-butene, 4-methyl-1-pentene and styrene, and in intimate admixture therewith, from about 0.02% to about 2% of a thiodiarylamine having the formula

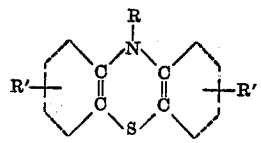

wherein each pair of carbon atoms in the thiazine nucleus is a part of an aryl nucleus, R is selected from the group consisting of hydrogen and lower alkyl radicals, and R' is selected from the group consisting of hydrogen, lower alkyl, hydroxy, halogen, nitro, cyano and alkoxy radicals and from about 0.01% to about 5% of a dialkyl ester of thiodiproprionic acid.

11. The composition of claim 10 wherein the thiodiarylamine is phenothiazine and the dialkyl ester of thiodipropionic acid is the dilauryl ester.

12. The composition of claim 10 wherein the thiodiarylamine is benzophenothiazine and the dialkyl ester of thiodipropionic acid is the dilauryl ester.

13. The composition of claim 11 wherein the polyolefin is poly(4-metyl-1-pentene).

14. The composition of claim 12 wherein the polyolefin is poly(4-methyl-1-pentene).

15. The composition of claim 11 wherein the polyolefin is poly(3-methyl-1-butene).

16. The composition of claim 11 wherein the polyolefin is polypropylene.

17. The composition of claim 11 wherein the polyolefin is polystyrene.

References Cited in the file of this patent
UNITED STATES PATENTS

| 2,519,755 | Gribbins | Aug. 22, 1950 |
| 2,605,249 | Albert | July 29, 1952 |